United States Patent
Tanioka

[19]

[11] Patent Number: 5,809,535
[45] Date of Patent: Sep. 15, 1998

[54] CACHE MEMORY CONTROL APPARATUS UTILIZING A BIT AS A SECOND VALID BIT IN A TAG IN A FIRST MODE AND AS AN ADDITIONAL ADDRESS BIT IN A SECOND MODE

[75] Inventor: Takahiro Tanioka, Yamanashi, Japan

[73] Assignee: NEC Corporation, Tokyo, Japan

[21] Appl. No.: 635,231

[22] Filed: Apr. 12, 1996

[30] Foreign Application Priority Data

Apr. 14, 1995 [JP] Japan ................................... 7-088918

[51] Int. Cl.$^6$ ....................................................... G06F 13/00
[52] U.S. Cl. ............................. 711/144; 711/128; 711/3; 364/DIG. 1
[58] Field of Search ................................... 395/455, 403, 395/471

[56] References Cited

U.S. PATENT DOCUMENTS

| | | | |
|---|---|---|---|
| 4,244,033 | 1/1981 | Hattori | 395/455 |
| 4,942,521 | 7/1990 | Hanawa et al. | 395/455 |
| 5,367,659 | 11/1994 | Iyengar et al. | 395/455 |
| 5,483,644 | 1/1996 | Richardson | 395/403 |
| 5,586,279 | 12/1996 | Pardo et al. | 395/403 |

FOREIGN PATENT DOCUMENTS

| | | |
|---|---|---|
| 0448205 A2 | 2/1991 | European Pat. Off. . |
| 5712222 | 3/1982 | Japan . |
| WO 81/01894 | 7/1981 | WIPO . |

OTHER PUBLICATIONS

Yong. S. Lee, "A Secondary Cache Controller Design for a High–End Microprocessor", Aug. 1992, IEEE Journal of Solid–State Circuits, vol. 27(8), pp. 1141–1146.

*Primary Examiner*—Frank J. Asta
*Attorney, Agent, or Firm*—Whitham, Curtis, Whitham & McGinn

[57] ABSTRACT

A cache memory control apparatus for a cache memory having a data memory, includes an address array, a valid bit register, a comparator, and a dual-purpose register. The dual-purpose register stores one of a valid bit and a part of an address tag. The cache memory control apparatus applies to both a standard system with a plurality of blocks-per-line and a subordinate system with one block-per-line.

21 Claims, 5 Drawing Sheets

| MODE SELECT SIGNAL 104 | XOR GATE 170 | SELECTOR 120 | NAND GATE 180 | COMMENTS |
|---|---|---|---|---|
| 0 | X | V1 | 1 | STANDARD SYSTEM |
| 1 | 0 | AA | 1 | SUB SYSTEM<br>BLOCK SELECT = AA |
| | 1 | | 0 | BLOCK SELECT ≠ AA |

X: DON'T CARE

CACHE MEMORY CONTROL APPARATUS UTILIZING A BIT AS A SECOND VALID BIT IN A TAG IN A FIRST MODE AND AS AN ADDITIONAL ADDRESS BIT IN A SECOND MODE

BACKGROUND OF THE INVENTION

The present invention relates to a cache memory control apparatus including an address array and a plurality of valid bits, and more particularly to a cache memory control apparatus for selectively connecting between a processor and a main memory, a data memory of the cache memory having a selectively varied capacity. The data memory's capacity is selectively alterable according to system performance demands.

In a computer system, a memory capacity of a cache memory is required to be changed for system balance. For example, a standard two-processor system may be changed to become a subordinate one-processor system. In this case, the memory capacity of the standard system is too much for the subordinate system model since the performance of the subordinate system model is lower than that of the standard system model.

Hence, a single line of the cache memory (or data memory of the cache memory) typically may be subdivided into a plurality of blocks. A "block" is a block of data to be transferred between a cache memory and a main memory in one bus transaction (e.g., one bus cycle). Thus, a size of the block corresponds to a data size for one bus transaction. The "line" is a set of data to be managed by one address tag. Thus, a line size is greater than or equal to a block size.

Referring to FIG. 2, an example of a 2 blocks-per-line structure shows that a 128-byte line has two 64-byte blocks. Then, data of the 128-byte line is managed with one tag (e.g., an address tag) and two valid bits. A valid bit indicates whether a corresponding block is valid. Each valid bit of the set of the valid bits corresponds to one block.

On the other hand, an example of a 1 block-per-line structure shows that a 64-byte line has one 64-byte block. Thus, data of the 64-byte line is managed with one tag and one valid bit.

Referring to FIG. 3, a conventional cache memory control system with two blocks-per-line has a 512-kilo-byte (512 KB) data memory 850 which is divided into two blocks 256 KB each. An address register 810 stores a 32-bit address which comprises a 13-bit tag, a 12-bit index (e.g., $2^{12}$), and a 7-bit block offset. The index is used to select a row (e.g., a set) of a cache memory. The tag is used as a matching key to find a line. The block offset is used to select the desired data from the block.

An address array 830, two sets of valid bits 840 and the data memory 850 have 4096 words (e.g., sets) because they are indexed by the 12-bit index. The address array 830 stores 13-bit tags (e.g., address tags). The valid bits 840 are divided into two sets V0 and V1 each of which has a 1-bit width. The data memory 850 is divided into two sets D0 and D1 each of which has a 64-byte block.

A selector 870 selects the desired data from 128-byte data according to the block offset 810. A comparator 860 compares a tag stored in the address array 830 and a tag of the address register 810. AND gates 890 and 891 perform a logical AND operation on an output of the comparator 860 and outputs of the valid bits 840. If the comparator 860 detects "coincidence", and the valid bit indicates "valid", the data from the selector 870 is appropriate (e.g., a "cache HIT"). If not, a "cache MISS" occurs.

Referring to FIG. 4, on the other hand, a conventional system with one block-per-line has a 256 KB data memory 950. An address register 910 stores a 32-bit address which comprises a 14-bit tag, a 12-bit index, and a 6-bit block offset. The block offset has 6 bits because the data memory 950 has 256 KB. Thus, the tag is 14-bits long. Therefore, an address array 930 and a comparator 960 also are 14-bits long.

Comparing FIG. 3 and FIG. 4, if a system is required to satisfy both structures, the system must prepare a 14-bit address array (as in the structure of FIG. 4) and two sets of valid bits (as in the structure of FIG. 3). Thus, in the conventional cache memory control apparatus, when 2 blocks are used per line (as in the structure of FIG. 3), 1 bit of the address array is unused. On the other hand, when 1 block is used per line (as in the structure of FIG. 4), one of the valid bits is unused. Therefore, there are continuously unused memory areas in the conventional cache memory control apparatus. Thus, a large-scale-integrated (LSI) chip having an unnecessarily large chip area results and thus valuable chip "real estate" is wasted.

SUMMARY OF THE INVENTION

In view of the foregoing problem of the conventional system, an object of the present invention is to eliminate the unused memory area in a cache memory control apparatus and to minimize the size of LSI chip as well as to prevent valuable chip real estate from being wasted.

In a cache memory control apparatus according to a first aspect of the present invention, a searching circuit searches a line in a cache memory. Validity indicating circuits indicate validity of a block in the line searched by the searching circuits. Dual-purpose circuits indicate validity of a second block in the line searched by the searching circuit. The dual-purpose circuits also search the line in the cache memory complementarily.

With the unique and unobvious structure of the present invention, a number of blocks in a line is selectable without any wasted memory area and without making the chip area unnecessarily large.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENT

A cache memory control apparatus in accordance with a preferred embodiment of the present invention will be described in detail with reference to the accompanying drawings.

Figure 1:
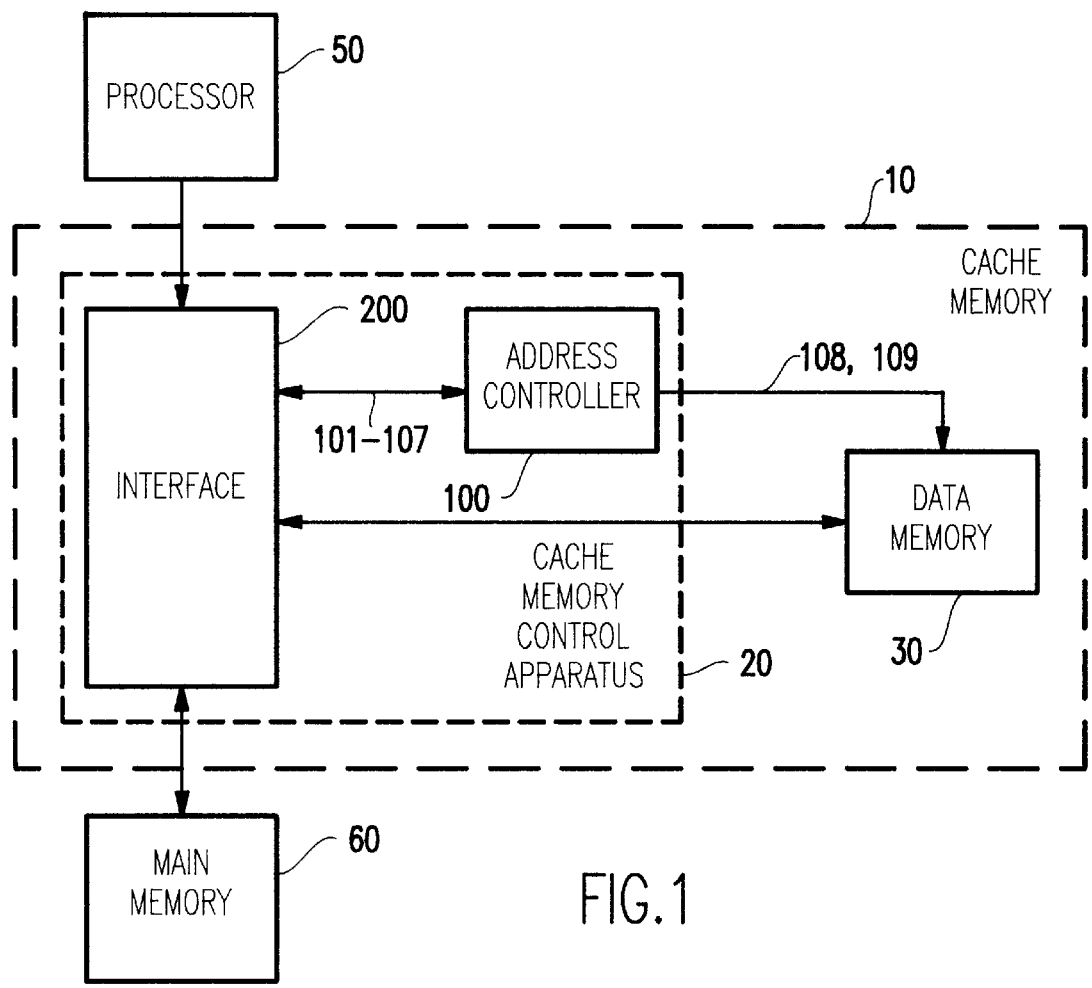
FIG. 1 is a block diagram showing the configuration of a computer system in which a cache memory control apparatus according to a first embodiment of the present invention is employed.
Figure 2:
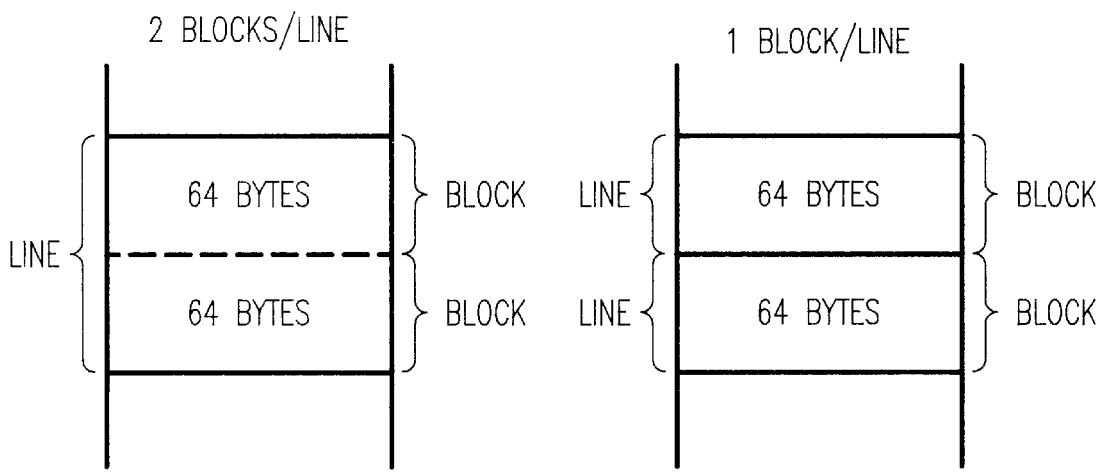
FIG. 2 illustrates memory maps for 2 blocks-per-line and 1 block-per-line configurations, respectively.
Figure 3:
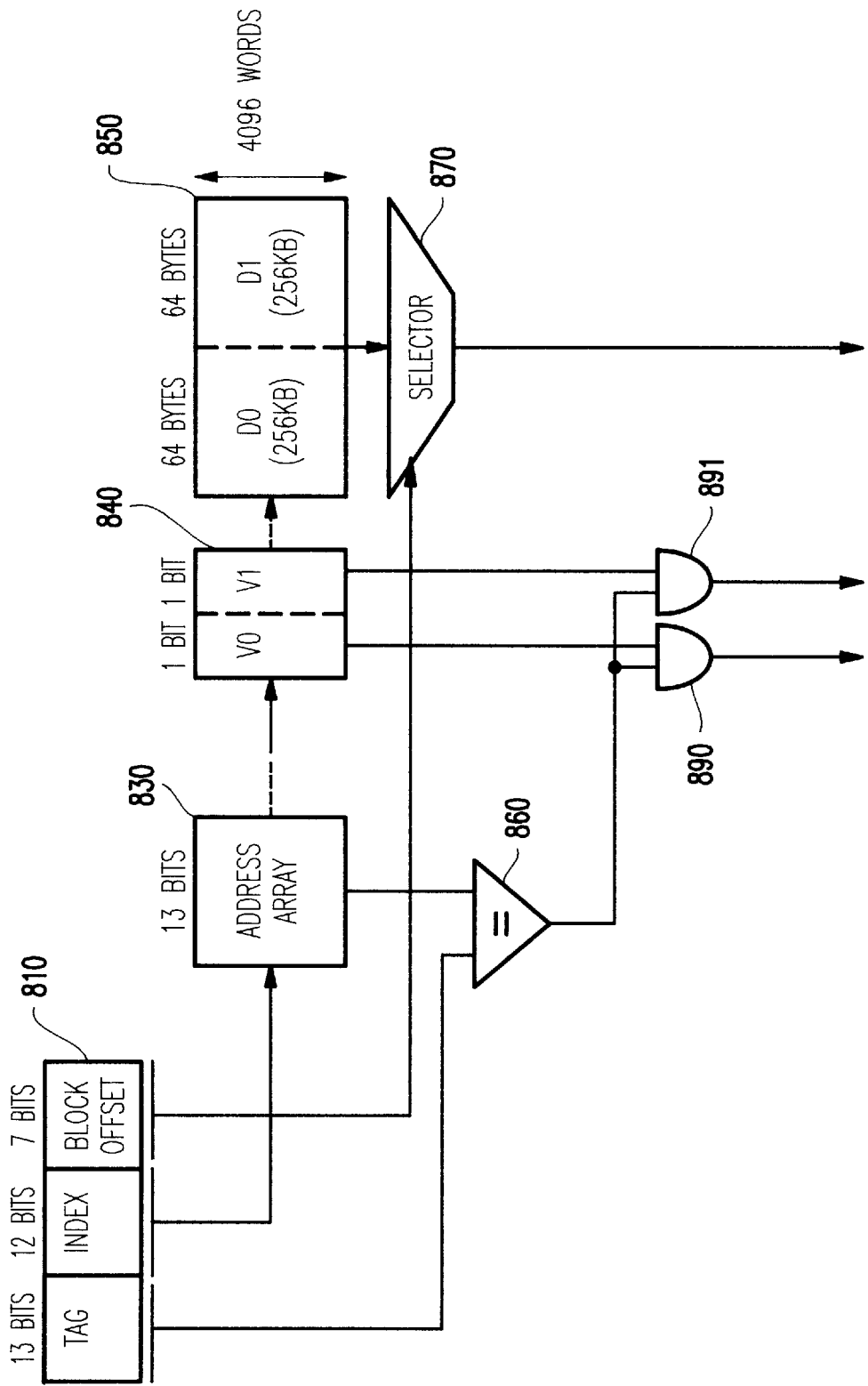
FIG. 3 is a block diagram showing the configuration of a conventional cache memory with 2 blocks-per-line.
Figure 4:
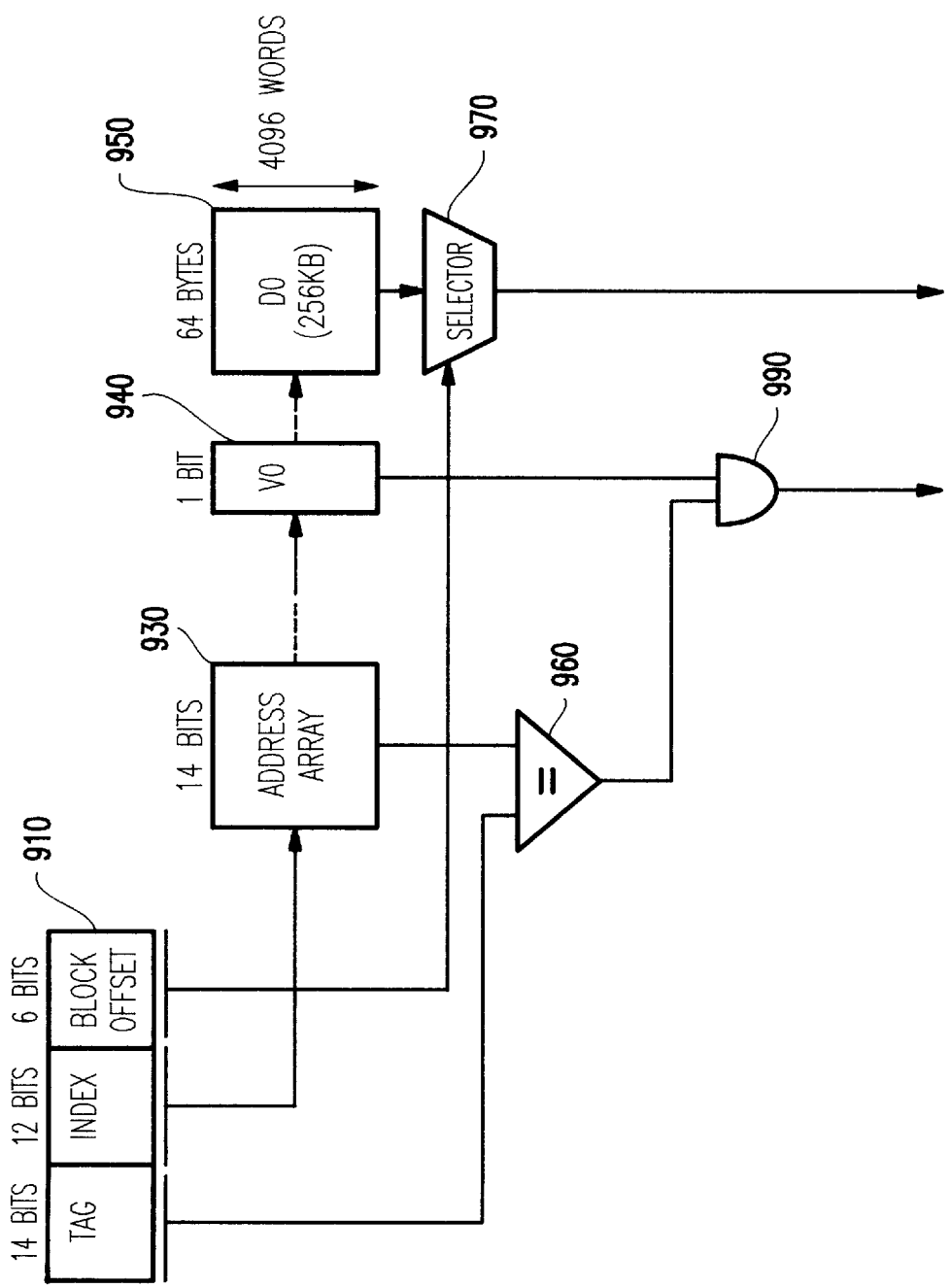
FIG. 4 is a block diagram showing the configuration of a conventional cache memory with 1 block-per-line.

Referring to FIG. 1, a computer system in which the present invention may be employed, has at least one processor 50, a main memory 60, and a cache memory 10 connected between the processor 50 and the main memory 60. The cache memory 10 has a cache memory control apparatus 20 and a data memory 30. The data memory 30 comprises memory (e.g., static random access memory (SRAM), or dynamic random access memory (DRAM)) cells. A capacity of the data memory 30 is changeable according to the demands of system performance. Also, a number of processors 50 connectable to the cache memory 10 is changeable according to system performance demands.

A single line of the data memory 30 may be subdivided into a plurality of blocks. For simplicity, a line of the data memory 30 has either one block or two blocks in this first embodiment as described below.

The cache memory control apparatus 20 has an address controller 100 and an interface 200. The address controller 100 determines a "cache HIT" and a "cache MISS" based on an address issued by the processor 50. The interface 200 connects between the processor 50 and the main memory 60. The interface 200 sends the address issued by the processor 50 to the address controller 100, and receives the "cache HIT" signal from the address controller 100. The interface 200 transfers data between the data memory 30 of the cache memory 10 and the main memory 60 according to information from the address controller 100.

Figure 5:
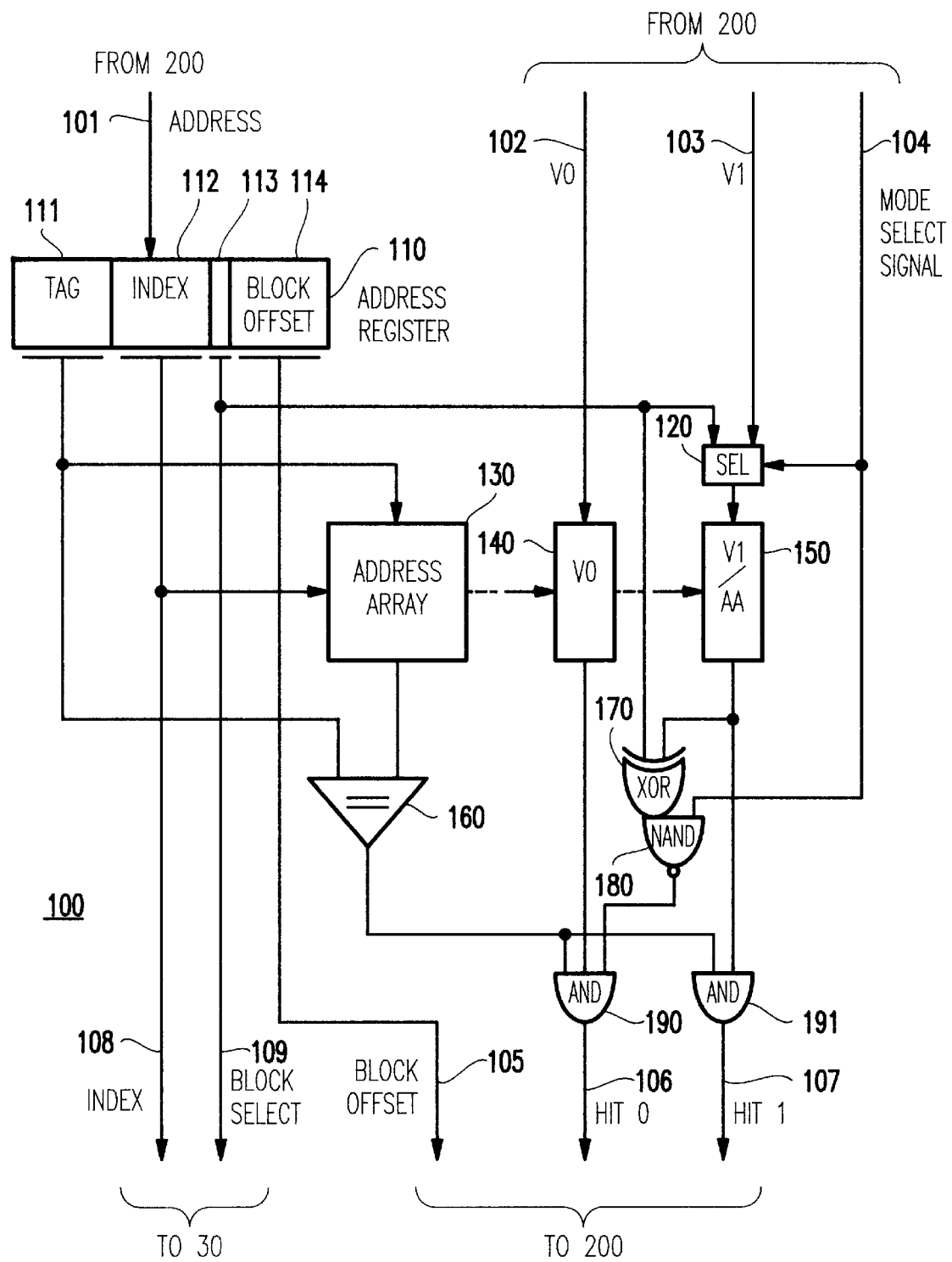
FIG. 5 is a block diagram showing the configuration of an address controller 100 in the cache memory control apparatus 20 according to the first embodiment of the present invention.

Referring to FIG. 5, the address controller 100 of the cache memory control apparatus 20 according to the present invention is shown. An address register 110 stores an address which comprises a tag 111, an index 112, a block control 113, and a block offset 114. The index 112 is used to select a row (e.g., a set) of the cache memory. The tag 111 is used for comparison to find a line of the data memory 30 of the cache. The block control 113 is used to select the desired block in the line of the data memory 30. The block offset 114 is used to select the desired data from the block.

An address array 130 stores tags (e.g., address tags). A valid bit register 140 stores valid bits (V0) which indicate whether corresponding first blocks are valid. A register 150 stores bits, each of which is either a valid bit of a second block (V1) or a part of an address tag (AA). Thus, the register 150 is preferably a dual-purpose register. The address array 130, the valid bit register 140, and the register 150 are indexed by the index 112.

A selector 120 selects one of the block control 113 and a valid bit (V1) 103 indicating that a second block in a line of the data memory 30 is valid. The selector 120 is controlled by a mode select signal 104 issued by interface 200.

The mode select signal 104 indicates whether the computer system is in a standard system mode, or in a sub-system (e.g., subordinate system) mode. When the standard system mode is indicated by the mode select signal 104 (e.g., a "0"), the cache memory 10 has 2 blocks-per-line. When the sub-system mode is indicated by the mode select signal 104 (e.g., a "1"), the cache memory 10 has 1 block-per-line. As mentioned above, the mode select signal 104 is sent from the interface 200. The interface 200 may have a register which stores the mode select signal.

A comparator 160 compares a tag stored in the address array 130 with a tag 111 of the address register 110. A "cache HIT" in the first block is indicated when an output of an AND gate 190 is "1". The AND gate 190 performs a logical AND operation on an output of the comparator 160, an output of the valid bit register 140, and an output of an NAND gate 180.

The NAND gate 180 logically NANDs (e.g., a NOT-AND logical operation) between the mode select signal and an output of an XOR gate 170. The XOR gate 170 performs a logical XOR (exclusive-OR) operation between the block control 113 and an output of the register 150. Thus, the XOR gate 170 functions as a 1-bit comparator. A "cache HIT" in the second block is indicated when an output of an AND gate 191 is "1". The AND gate 191 performs a logical AND operation between an output of the comparator 160 and the output of the register 150.

The selector 120, the register 150, the XOR gate 170, the NAND gate 180, and the AND gates 190 and 191 form a block controller for controlling both of the valid bits (V1) for the second block and a part of an address tag (AA).

For brevity, detailed control signals (e.g., a write or read control signal) are omitted.

Assuming that the data memory 30 is one of 256 KB and 512 KB, and a block size is 64 B, for example, the tag 111 is 13-bits long, the index 112 is 12-bits long, the block control 113 is 1-bit long, and the block offset is 6-bits long. Then, a width of the address array 130 is 13-bits long. Each width of the registers 140 and 150 is 1-bit long.

Figures 6, 7:
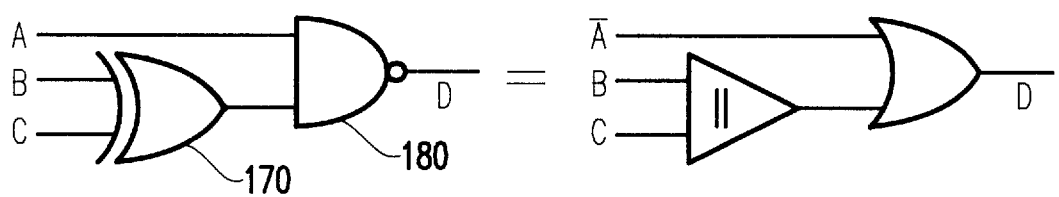
FIG. 6 is a table showing an operation of the cache memory control apparatus according to the first embodiment of the present invention.
FIG. 7 is a diagram showing a function of a combination of an XOR gate 170 and an NAND gate 180 used in the address controller 100 shown in FIG. 5.

Referring to FIG. 6 and as mentioned above, the mode select signal 104 indicates a mode of the system. For example, if the mode select signal 104 is "0", the computer system is in a standard system mode. If the mode select signal 104 is "1", the computer system is in a sub-system mode. When the computer system is in the standard system mode, the selector 120 selects the valid bit (V1) 103 because the register 150 stores valid bits (V1). When the computer system is in the sub-system mode, the selector 120 selects the block control 113 because the register 150 stores part of the address tag (AA).

The output of the NAND gate 180 is "1" whenever the computer system is in the standard system mode (e.g., the mode select signal 104 is "0"). Therefore, an output of the AND gate 190 depends on neither the block control 113 nor contents of the register 150 in the standard mode.

On the other hand, when the computer system is in the sub-system mode (e.g., the mode select signal 104 is "1"), the output of the NAND gate 180 is opposite that of the output of the XOR gate 170. Thus, the output of the NAND gate 180 is "1" only if part of the address tag (AA) coincides with the block control 113. Therefore, the output of the AND gate 190 may indicate "1" (e.g., a "cache HIT") if there is coincidence in the sub-system mode.

Referring to FIG. 7, a combination of the XOR gate 170 and the NAND gate 180 functions as a combination of a 1-bit comparator and an OR gate. Therefore, a combination of the N-bit comparator 160, the XOR gate 170, the NAND gate 180, and the AND gate 190 works as an (N+1)-bit comparator, where N is a positive integer. Moreover, if the mode select signal 104 is "0", an output of the (N+1)-bit comparator is always "1" because of the OR-gated function.

Hereinbelow and referring to FIGS. 5 and 6, the operation of the cache memory control apparatus in accordance with the above-mentioned first embodiment of the present invention will be described.

First, a registering operation of the address array 130 in the standard system mode is described hereinbelow.

A request address sent from the processor 50 via the interface 200 is stored in the address register 110. In the subsequent cycle (e.g., machine cycle), the tag 111 of the address register 110 is written to the address array 130. At this time, the index 112 in the address register 110 is used as a write address to the address array 130.

At the same time, the valid bit (V0) 102 is written into the address of the register 140. The value of the valid bit (V0) 102 becomes "1" when the first block to be registered is valid, and becomes "0" when the first block to be registered is invalid. As apparent from FIG. 6, since the output from the selector 120 corresponds to a valid bit (V1) in this case, the valid bit (V1) is written into the register 150. Similar to the value of the valid bit (V0), the value of this valid bit (V1) becomes "1" when the second block to be registered is valid, and becomes "0" when the second block to be registered is invalid. The index 112 is outputted as a write address to the data memory 30. Regarding the block control 113, when this block select is "0", it indicates the writing operation to the first block, whereas when this block select becomes "1", it indicates the writing operation to the second block. The registering operation to the address array 130 is complete at this time.

Second, a retrieval operation of the address array 130 in the standard system mode is described hereinbelow.

Similar to the registering operation into the address array 130, the request address first sent is stored into the address register 110. In the next cycle, the index 112 is used as a read address for the address array 130, the register 140, and the register 150. The comparator 160 compares the tag 111 with the tag in the address array 130, and outputs "1" when coincidence occurs, and outputs "0" when there is no coincidence.

As apparent from FIG. 6, in this case, since the NAND gate 180 continuously outputs "1", the AND gate 190 outputs the same value as the output from the comparator 160 as a "cache HIT" signal of the first block when the value of the valid bit (V0) is "1" (e.g., the required block is registered). When the value of the valid bit (V0) is "0" (e.g., the required block is not registered), the output from the AND gate 190 continuously becomes "0" (e.g., a "cache MISS").

Similarly, the AND gate 191 outputs the same value as the output of the comparator 160 when the value of the valid bit (V1) is "1", and continuously outputs "0" when the value of the valid bit (V1) is "0".

The index 112 is outputted as an address used to index the data memory 30. When the block control 113 is "0", this value indicates the reading operation from the first block. When this value is "1", this value indicates the reading operation from the second block.

Third, a registering operation of the address array 130 in the sub-system mode is described hereinbelow.

Similarly to the above operations, the request address is registered into the address register 110.

In the subsequent cycle, the tag 111 is written into the address array 130, and the valid bit (V0) 102 is written into the register 140.

Referring now to FIG. 6, in this case, since the selector 120 outputs the tag 111, the output from the selector 120 is written into the register 150.

The index 112 is provided for the data memory 30.

Fourth, a retrieval operation of the address array 130 in the sub-system mode is described hereinbelow.

Similar to the previous operation, in a cycle subsequent to the cycle where the request address is registered in the address register 110, the address array 130, the register 140, and the register 150 are indexed by the index 112.

As apparent from FIG. 6, a comparison result between the block control 113 and the valid bit (V1) from the register 150 is outputted as the output of the NAND gate 180. The output from the NAND gate 180 becomes "1" when the comparison result is "coincident", whereas the output from the NAND gate 180 is "0" when the comparison result is "incoincident".

The AND gate circuit 190 logically ANDs the output of the comparator 160 and the output of the NAND gate 180 to thereby output the AND-gated signal as a "cache HIT" signal when the value of the valid bit (V0) is "1". At this time, a "cache HIT" signal of the second block outputted from the AND gate 191 is unused.

The index 112 is provided for the data memory 30.

In the above-described embodiment, a cache memory has one address array (e.g., a "direct-mapped cache"). However, the present invention may be applied to other types of cache memories (e.g., a "set-associative cache" or a "fully-associative cache"). For example, a 2-way set-associative cache memory may have two sets of the address array 130, the register 140, the register 150, the comparator 160, the selector 120, and the logic gates 170, 180, 190, and 191.

As is apparent from the above description, according to the present invention, since the register 150 is used both to store valid bits of the second block in the standard system mode and to store part of the address tag in the sub-system mode, a number of blocks in a line of a data memory of a cache memory is selectable without any wasted memory area.

While the invention has been described in terms of a preferred embodiment, those skilled in the art will recognize that the invention can be practiced with modification within the spirit and scope of the appended claims.

What is claimed is:

1. A cache memory control apparatus for a cache memory including a data memory, comprising:

an address array for storing an address tag;

a comparator for comparing a first part of a requested address with the address tag stored in said address array;

a valid register for storing a first valid bit corresponding to the address tag stored in said address array;

a block controller for storing one of a second valid bit if said cache memory is in a first mode and an additional part of the address tag if said cache memory is in a second mode, and for comparing the additional part of the address tag with a second part of the requested address; and wherein said block controller comprises a selector for selecting one of the second valid bit if said cache memory is in the first mode and the additional part of the address tag if said cache memory is in the second mode.

2. The cache memory control apparatus according to claim 1, wherein said block controller comprises a second comparator for comparing the additional part of the address tag with said second part of the requested address.

3. The cache memory control apparatus according to claim 2, wherein said block controller comprises a plurality of merging circuits for outputting one of an active signal if said cache memory is in the first mode and an output of said second comparator if said cache memory is in the second mode.

4. The cache memory control apparatus according to claim 1, wherein said block controller comprises a dual-purpose register for storing one of the second valid bit if said cache memory is in the first mode and the additional part of the address tag if said cache memory is in the second mode.

5. The cache memory control apparatus according to claim 1, wherein said cache memory comprises a direct-mapped cache memory.

6. The cache memory control apparatus according to claim 1, wherein said address array and said valid register include a plurality of words.

7. The cache memory control apparatus according to claim 1, wherein said cache memory comprises a set-associative cache memory.

8. The cache memory control apparatus according to claim 1, further comprising a plurality of said address arrays, a plurality of said comparators, and a plurality of said valid registers.

9. The cache memory control apparatus according to claim 8, wherein said address array, said valid register and said dual-purpose register include only one word.

10. The cache memory control apparatus according to claim 1, wherein said cache memory comprises a fully-associative cache memory.

11. The cache memory control apparatus according to claim 1, wherein said block controller comprises a dual-purpose register for storing one of the second valid bit if said cache memory is in the first mode and the additional part of the address tag if said cache memory is in the second mode.

12. A cache memory control apparatus for a cache memory including a data memory, comprising:

an address array for storing an address tag;

a comparator for comparing a first part of a requested address with the address tag stored in said address array;

a valid register for storing a first valid bit corresponding to the address tag stored in said address array; and a block controller for storing one of a second valid bit if said cache memory is in a first mode and an additional part of the address tag if said cache memory is in a second mode, and for comparing the additional part of the address tag with a second part of the requested address, wherein said requested address comprises:
a tag for being compared by said comparator, as said first part of said requested address;
an index for indexing said address array and said valid register;
a block offset for selecting data in said data memory; and
a block control for being used as one of an additional part of the block offset if said cache memory is in the first mode, and an additional part of the tag, as said second part of the requested address, if said cache memory is in the second mode.

13. The cache memory control apparatus according to claim 12, wherein said block controller comprises a selector for selecting one of the second valid bit if said cache memory is in the first mode and the additional part of the address tag if said cache memory is in the second mode.

14. The cache memory control apparatus according to claim 13, wherein said block controller comprises a second comparator for comparing the additional part of the address tag with said second part of the requested address.

15. The cache memory control apparatus according to claim 14, wherein said block controller comprises a plurality of merging circuits for outputting one of an active signal if said cache memory is in the first mode and an output of said second comparator if said cache memory is in the second mode.

16. The cache memory control apparatus according to claim 14, wherein said block controller comprises a dual-purpose register for storing one of the second valid bit if said cache memory is in the first mode and the additional part of the address tag if said cache memory is in the second mode.

17. The cache memory control apparatus according to claim 16, wherein said address array, said valid register and said dual-purpose register include a plurality of words.

18. The cache memory control apparatus according to claim 13, wherein said block controller comprises a dual-purpose register for storing one of the second valid bit if said cache memory is in the first mode and the additional part of the address tag if said cache memory is in the second mode.

19. A cache memory control apparatus for a cache memory including a data memory, comprising:

an address array for storing an address tag;

a comparator for comparing a first part of a requested address with the address tag stored in said address array;

a valid register for storing a first valid bit corresponding to the address tag stored in said address array; and a block controller for storing one of a second valid bit if said cache memory is in a first mode and an additional part of the address tag if said cache memory is in a second mode, and for comparing the additional part of the address tag with a second part of the requested address, wherein said block controller comprises a second comparator for comparing the additional part of the address tag with said second part of the requested address, wherein said requested address comprises:
a tag for being compared by said comparator, as said first part of said requested address;
an index for indexing said address array and said valid register;
a block offset for selecting data in said data memory; and
a block control for being used as one of an additional part of the block offset if said cache memory is in the first mode, and an additional part of the tag, as said second part of the requested address, if said cache memory is in the second mode.

20. The cache memory control apparatus according to claim 19, wherein said block controller comprises a selector for selecting one of the second valid bit if said cache memory is in the first mode and the additional part of the address tag if said cache memory is in the second mode.

21. The cache memory control apparatus according to claim 1, wherein said block controller comprises a plurality of output circuits for outputting a signal for indicating whether a data of the required address is in the cache memory.

* * * * *